July 24, 1962   E. M. HERRMANN   3,045,963
GATE VALVE
Filed July 17, 1959   2 Sheets-Sheet 1
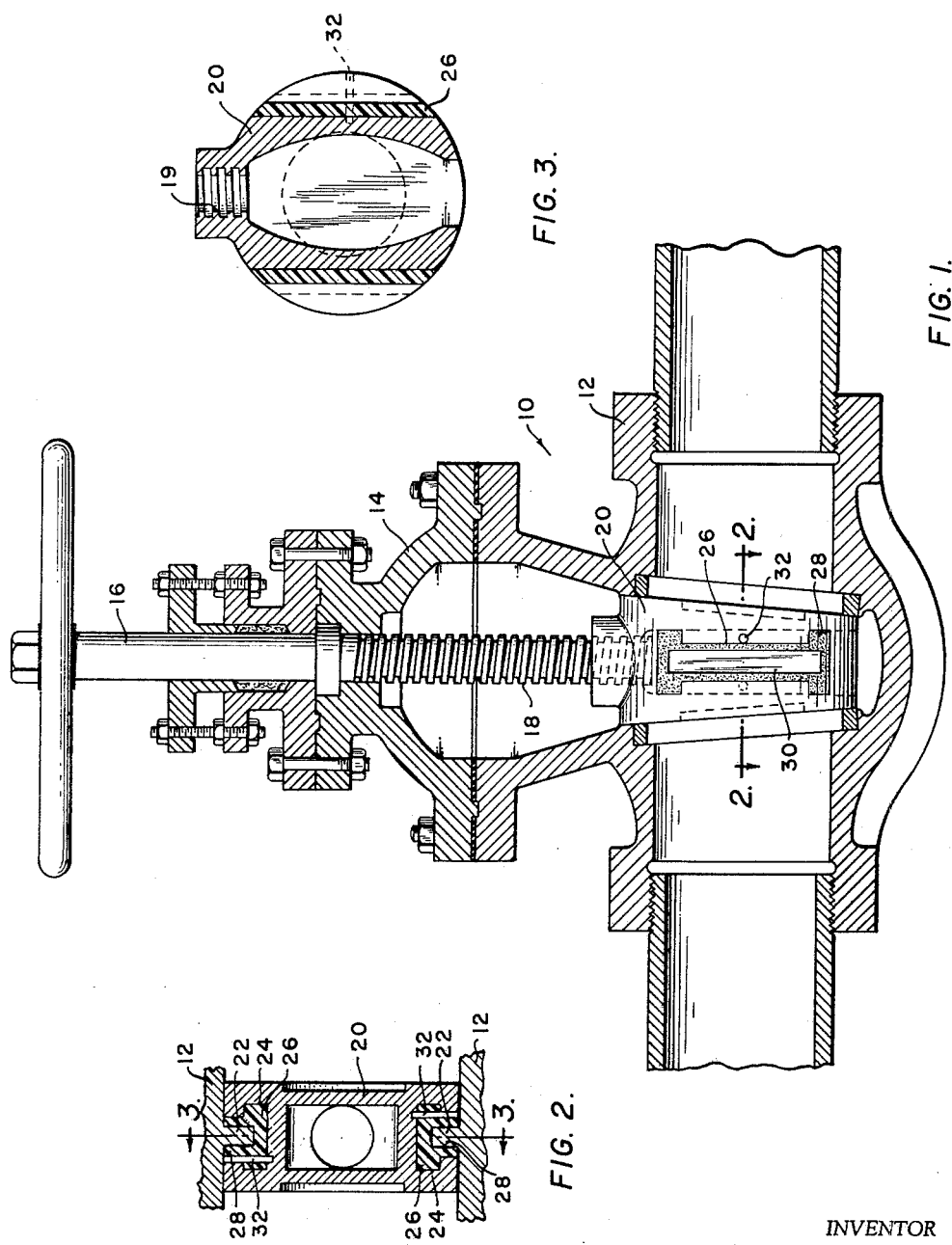
INVENTOR
EDWARD M. HERRMANN
BY
ATTORNEYS July 24, 1962  E. M. HERRMANN  3,045,963
GATE VALVE Filed July 17, 1959  2 Sheets-Sheet 2

INVENTOR
EDWARD M. HERRMANN

BY B. L. Zangwill
ATTORNEY 3,045,963
GATE VALVE
Edward M. Herrmann, 105 Round Bay Road,
Severna Park, Md.
Filed July 17, 1959, Ser. No. 827,979
5 Claims. (Cl. 251—327)
(Granted under Title 35, U.S. Code (1952), sec. 266)

The invention described herein may be manufactured and used by or for the Government of the United States of America for governmental purposes without the payment of any royalties thereon or therefor.

This invention relates to a gate valve and more particularly to a noise-free gate member in a gate valve.

The usual gate valve comprises a main valve body, a gate reciprocable in said body to and from valve-open and valve-closed position, a valve stem for moving the gate, and a handle on the stem. The gate is usually moved by rotation of the handle and stem which causes the gate to move across a fluid passageway in the valve body. A seal or closure occurs by wedging action of the gate within a mating seat of the body. To guide the gate, guide ribs are formed on the interior of the valve body that cooperate with grooves in opposite edges of the gate. This prior art construction has certain material disadvantages among which is the fact that during closing of the gate in a moving fluid, said gate may rattle as a function of the clearance between the aforementioned ribs and grooves, and the position of the gate in the body. More specifically, it has been found by actual measurement, that the sound level in a piping system containing a moving fluid increased by 12 db when the gate began to rattle. The instant invention prevents or at least substantially reduces the aforementioned gate rattle.

In accordance with the instant invention, the conventional groove found in a valve gate is modified so as to accept a plastic or other resilient insert having a groove therein adapted to cooperate with the ribs. In accordance with the preferred embodiment of the instant invention the valve gate insert is formed of tetrafluoroethylene, sold under the trade name Teflon.

An object of this invention is to provide a quiet gate valve.

A further object of this invention is to provide a gate valve having means adapted to prevent resonant vibration of the gate due to the flow of fluid through the valve in which it is mounted.

Still another object of this invention is to provide a gate valve having a gate with a self lubricating guide track in the side edges thereof.

Other objects and many of the attendant advantages of this invention will be readily appreciated as the same becomes better understood by reference to the following detailed description when considered in conjunction with the accompanying drawings, wherein:

FIG. 1 is a sectional, elevation view of a gate valve constructed in accordance with this invention;

FIG. 2 is a sectional view taken on line 2—2 of FIG. 1;

FIG. 3 is a sectional view taken on line 3—3 of FIG. 2 showing only the gate of the valve;

Figure 4:
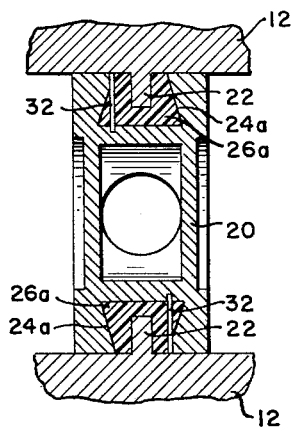
FIG. 4 is a sectional view, similar to FIG. 2, of a modified form of the invention.

Referring now to the drawings wherein like reference characters designate like or corresponding parts throughout the several views there is shown in FIG. 1 a gate valve 10.

The gate valve 10 comprises a body portion 12, a bonnet 14 and a rotatable stem 16 having a threaded portion 18 at the lower end thereof. The threaded portion 18 is threadedly mounted in a hole 19 formed in the upper end of a valve gate 20 of hollow construction, but having the opposite faces thereof closed so that it is adapted to block flow of fluid through the valve 10.

The valve body 12 is provided with a pair of guide ribs 22 mounted on opposite sides of said valve body. The guide ribs 22 conventionally ride in suitably provided slots in the edge sides of the valve gate 20, serving to prevent rotation of said valve gate as the stem 16 is rotated. By virtue of the interaction of the threaded portion 18 and the threaded hole 19 in the valve gate 20, rotation of the stem 16 causes the valve gate 20 to move downwardly into the throat of the valve body 12, since said valve gate cannot rotate with the stem 16.

In accordance with the instant invention the aforementioned grooves formed in the sides of the valve gate are substantially modified. More specifically, the respective sides of the valve gate are each provided with a slot 24 (FIG. 2) which in accordance with the preferred embodiment of the invention is dove-tailed (FIG. 4) or is T-shaped in cross-section (FIG. 2). A tetrafluoroethylene insert 26 is either cut, molded or otherwise formed so as to have a cross-section coincident with the cross-section of the slot 24 and is placed in said slot in the manner shown in FIG. 2 by being slid into said slot or by otherwise being formed therein. For example, instead of the insert 26 being slid into the slot 24, said insert 26 may be directly molded into the slot having an outermost portion thereof 28 extending outwardly of the slot 24 to form a continuation of the outer side surfaces of the valve gate 20. The insert 26 conforms to the outer surface of the valve gate 20 and is provided with an elongated slot 30 adapted to receive the respective guide ribs 22, and prevent rotation of said valve gate as the stem 16 is rotated.

It is pointed out that the groove 24 may have various cross-sections other than T-shaped, so long as means is provided to prevent the Teflon insert 26 from falling out of the groove.

Each T-shaped insert 26 is held within a slot 24 by a pair of pins 32 extending from the outer surface of the valve gate 20, through the body thereof, through a portion of the T-shaped insert 26 and thence again into the body of the valve gate 20. The pins 32 may be inserted in any desired manner, as for example by a press-fit or the like, and each pin has its outermost end flush with the outer surface of the valve gate 20. Thus, in accordance with the instant invention, the valve gate 20 is modified so as to have a resilient insert 26 at the respective sides thereof, said inserts being positively held in place by the aforementioned pins 32. In FIG. 4 the slot 24a has a dove-tail shaped insert 26a with a pair of pins 32 extending from the outer surface of the valve gate 20, through the body thereof, through a portion of the dove-tail shaped inserts 26a and thence again into the body of the valve gate 20.

It is pointed out that while the inserts 26 may be made of any resilient material, the most satisfactory results have been obtained by the use of tetrafluoroethylene, available under the trade name Teflon. It is emphasized that Teflon is an excellent lubricant and thus provides the side edges of the valve gate with a self lubricating member adapted to cooperate with the guide ribs 22 thereby resulting in smoother valve operation. In addition Teflon has the quality of creeping under load which is an advantage in the instant invention, because by design the Teflon can only distort out the ends of the slot 24 and therefore will not effect the operation of the valve gate 20. It is pointed out that after the Teflon has distorted from the initial operations of the valve gate 20 it will not distort any further because it is not under load.

As pointed out above, the main reason for the use of Teflon in the instant invention is that it acts as a vibration dampener, tending to dampen resonant vibrations which may be induced in the valve gate due to the flow of fluid through the valve when the valve is either partially or completely open. Furthermore, the Teflon, due to its inherently resilient nature, reduces any tendency of the valve gate to rattle, due to the interaction of the ribs 22 and the grooves 30 as the valve gate is being closed in a moving fluid. Hence the instant invention provides a new, novel and improved valve structure having a materially lower noise level, than is possible with the conventional metal to metal contact generally had between a valve gate and the valve body in which it is mounted.

It should be understood, of course, that the foregoing disclosure relates only to a preferred embodiment of the invention and that numerous modifications and alterations may be made therein without departing from the spirit and scope of the invention, as set forth in the appended claims.

What is claimed is:

1. A gate valve comprising a body having a passageway extending therethrough, a metal gate reciprocable transversely of the passageway to selectively close said passageway, a plurality of guide ribs formed within said body portion, said guide ribs cooperating with said gate to provide a guide means therefor on opposite sides of said passageway, said guide means comprising a pair of recesses in opposite sides of said gate, a noise-reducing vibration dampening resilient deformable plastic insert located within each of said recesses, and a slot formed in each of said inserts cooperating with and slidably receiving the respective guide ribs, and means locking each of said inserts in its associated recess.

2. A gate valve as set forth in claim 1 wherein each of said slots is T-shaped in cross-section and each of said inserts is T-shaped in cross-section and has substantially the same outer dimensions as the surface dimensions of the associated slot, thereby providing an intimate fit between said inserts and said slots.

3. A gate valve as set forth in claim 1 wherein each pair of associated slots and inserts is dove-tailed in cross-section with substantially the same outer dove-tail dimensions to provide an intimate fit between each of said slots and the associated insert.

4. A gate valve as set forth in claim 1 wherein each of said inserts is formed of tetrafluoroethylene.

5. A gate valve comprising a body having a passageway extending therethrough, a metal gate reciprocable transversely of the passageway to selectively close said passageway, a pair of guide ribs formed on said body portion on opposite sides of said passageway, said guide ribs cooperating with said gate to provide a guide means therefor, said guide means comprising a pair of recesses formed in said gate on opposite sides thereof, a noise reducing and vibration dampening resilient deformable tetrafluoroethylene insert fitted in each of said recesses, and a slot formed in each of said inserts slidably receiving one of said guide ribs, and pin means holding each of said inserts in its associated recess.

References Cited in the file of this patent

UNITED STATES PATENTS

| | | |
|---|---|---|
| 2,329,315 | Allen | Sept. 14, 1943 |
| 2,622,949 | Cotchett | Dec. 23, 1952 |
| 2,759,773 | Wilmer | Aug. 21, 1956 |
| 2,815,187 | Hamer | Dec. 3, 1957 |
| 2,851,051 | Englert | Sept. 9, 1958 |
| 2,937,765 | Shank | May 24, 1960 |
| 3,019,811 | Young et al. | Feb. 6, 1962 |

OTHER REFERENCES

Automotive Industries (pages 107 and 108), Sept. 1, 1954.